F. H. BAUMGARD.
CANDY SUGARING MACHINE.
APPLICATION FILED SEPT. 14, 1920.
1,391,604.
Patented Sept. 20, 1921.
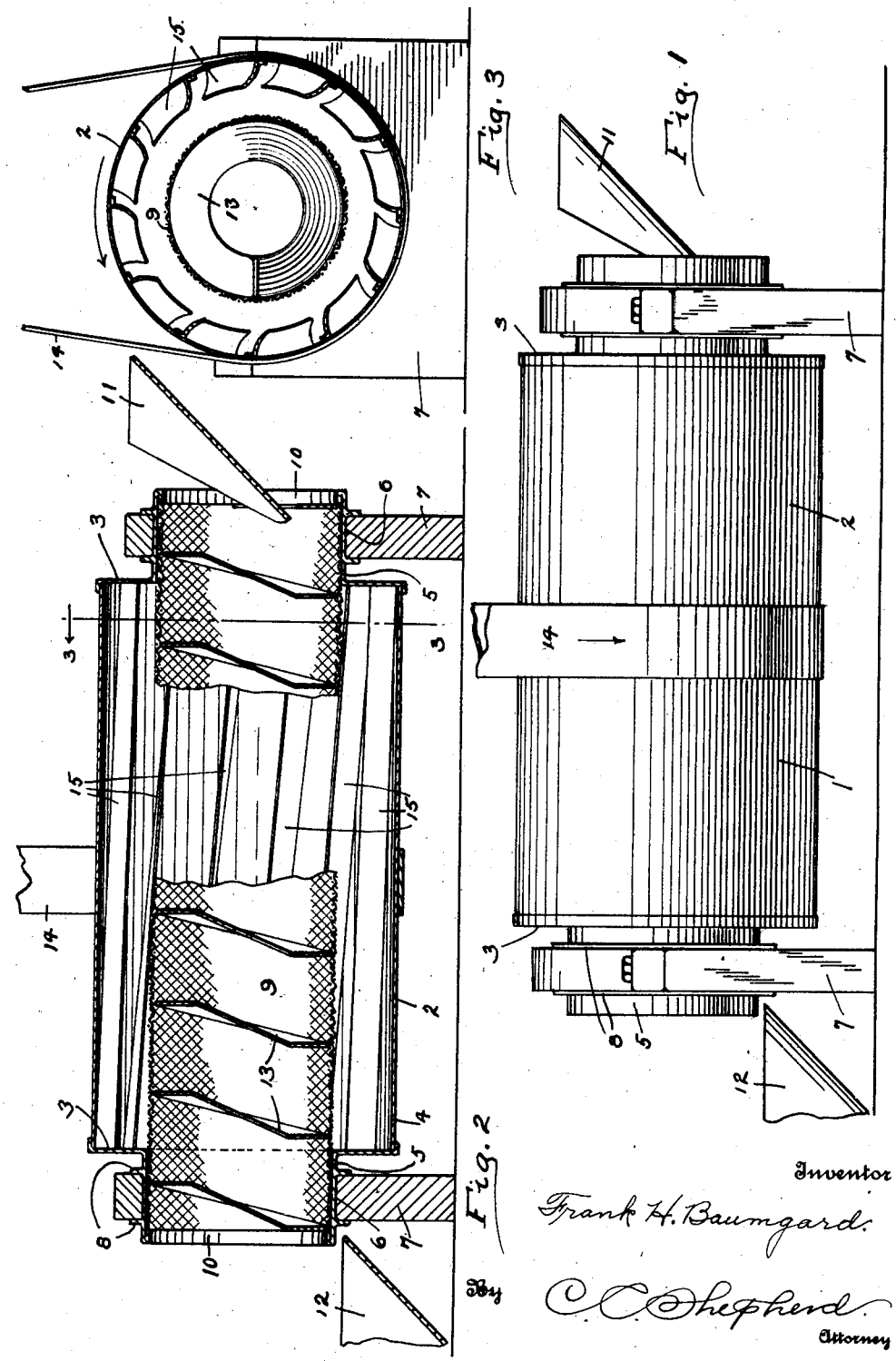
Inventor
Frank H. Baumgard.
By C. C. Shepherd
Attorney

UNITED STATES PATENT OFFICE.

FRANK H. BAUMGARD, OF COLUMBUS, OHIO.

CANDY-SUGARING MACHINE.

1,391,604.  Specification of Letters Patent.  Patented Sept. 20, 1921.

Application filed September 14, 1920. Serial No. 410,128.

*To all whom it may concern:*

Be it known that I, FRANK H. BAUMGARD, a citizen of the United States, residing at Columbus, in the county of Franklin and State of Ohio, have invented certain new and useful Improvements in Candy-Sugaring Machines, of which the following is a specification.

This invention relates to improvements in sugaring machines of the type employed in the art of candy manufacture, and has for its primary object to provide a machine of this nature wherein the element of manual handling will be reduced to a minimum and wherein sugar waste and loss will be appreciably lessened over prior methods.

In carrying out the invention use is made of a sugaring apparatus which consists of a cylindrical casing having reduced tubular ends which are suitably journaled to permit of the horizontal rotation of the casing about a longitudinal axis, said casing being formed to include a perforated inner shell having spiral flights arranged therein, means are provided in conjunction with the inner shell to permit candies to be inserted therein and to travel longitudinally thereof and to be discharged from the apparatus by the spiral flight construction, said inner shell being formed from a perforated material in order that sugar, contained in the tubular casing may sift through the inner shell and engage with the candies therein in order to coat the latter and at the same time to prevent undue loss or waste of sugar so utilized.

Another object of the invention resides in providing longitudinally extending flights within the outer casing of the apparatus, which flights are so disposed that when the casing is rotated the sugar within the latter will be caused to travel away from the ends of the casing, in order that loss of sugar through such ends will be avoided.

Other objects of the invention reside in an apparatus of this nature which will be simple, durable and efficient in construction, convenient and economical to operate and one wherein the element of manual handling and sugar wastage is reduced to a minimum.

With these and other objects in view as will appear as the description proceeds, the invention accordingly consists in the novel features of construction, combination of elements and arrangements of parts, hereinafter to be fully described and pointed out in the appended claims.

In the accompanying drawing, forming a part of this specification and in which similar characters of reference denote like and corresponding parts throughout the several views thereof:

Figure 1 is a side elevation of the improved sugaring apparatus comprising the present invention, Fig. 2 is a vertical longitudinal sectional view taken therethrough, and Fig. 3 is a transverse vertical sectional view taken on the plane disclosed by the line 3—3 of Fig. 2.

Referring more particularly to the drawings, there has been illustrated a candy sugaring machine 1 which, in the illustrated embodiment, consists of an outer tubular casing 2. This casing is preferably formed from metal and is of imperforate construction, the same being formed to include longitudinal end walls 3 which are suitably flanged for connection with the cylindrical wall 4 of the casing. The end walls 3 are provided with longitudinally extending sleeves 5 which are journaled for rotation within openings 6 formed in a pair of supporting walls 7. If desired, rings 8 may be provided upon the sleeves 5 for the purpose of preventing undue longitudinal movement of the casing with respect to the walls 7.

Extending axially through the casing 2 is an inner shell 9, which is preferably formed from a foraminated or perforated material and is adapted to extend the full length of the casing 2, the ends of the shell 9 being received within the inturned overhead portions 10 of the sleeves 5, and by virtue of the elongated sleeves 5 and the bearing surfaces provided thereby, it will be apparent that the inner shell will occupy a fixed relation with regard to the outer wall 4 and that there will be an absence of longitudinal binding or distortion in the intermediate portions of the shell 9. In the form of the invention shown intermediate brace connections between the shell 9 and the wall 4 are omitted, but in larger types of machines it will be apparent that such internal or intermediate braces may be provided for the shell.

The opposite ends of the shell 9 are open in order that a feeding trough 11 may extend into one end of the shell to permit of the convenient insertion of candies or like confection therein, which trough may lead to a suitable conveyer or other support upon which the candies are carried to the sugaring machine. Similarly, a trough 12 is provided at the discharge end of the shell and is capable of receiving the candies discharged therefrom. Also, the interior of the shell is provided with a spiral conveyer 13, whereby upon the rotation of the casing 2 in a predetermined direction, the candies positioned within the entrance end of the machine will be carried longitudinally through the latter by virtue of the conveyer construction and discharged into the trough 12, where the same may be suitably collected. It will be understood that the casing 2 is adapted to contain a suitable quantity of sugar of any suitable character which, upon the rotation of the casing, will sift through the foraminated wall of the shell 9 so as to come into contact with all surfaces of the candies which are being jostled and carried through by the revolving conveyer 13. It will be manifest that the candies within the shell 9 will be agitated, lifted and exposed on all sides to the sugar sifting through the shell 9, and hence, such candies will be thoroughly coated in a proper and desired manner when discharged from the machine. Any suitable means may be provided for rotating the casing 2, but this is ordinarily done by merely placing a driving belt 14 circumferentially around said casing, which arrangement is ordinarily reliable in effecting the desired rotation of the machine. Also, it will be observed that the internal walls of the casing 2 are provided with longitudinally extending lifting blades 15. These blades serve to prevent sugar from collecting in the bottom of the casing 2 by lifting the sugar, when the casing is rotated to certain levels, from which the sugar is permitted to fall through the walls of the shell 9 to engage with the candies therein. Normally, there is a tendency, on account of the conveyer 13, for the sugar to travel toward the discharge end of the machine which, if not counteracted, would result in wastage by reason of the premature discharge of the sugar in conjunction with the candies. However, by slightly curving the blades 15 in a longitudinal direction, the tendency of the sugar to travel toward the discharge end of the machine is overcome and the sugar is effectively maintained between the end walls 3.

In view of the foregoing it will be apparent that the present invention provides efficient, positive and reliable mechanism for sugar coating candies and other similar confection, and that by its use the element of manual handling and sugar waste will be reduced over prior methods heretofore employed in this industry. By the construction described the sugar placed within the apparatus is completely utilized thus overcoming a large loss involved in the wastage of sugar when hand methods are employed. The device is substantially automatic in operation and when employed in conjunction with conveyers the same does not require manual handling in any way to effect its operation. However, inasmuch as many changes could be made in the above construction and many apparently widely different embodiments of my invention could be made without departing from the scope thereof, it is intended that all matter contained in the above description as shown in the accompanying drawing shall be interpreted as illustrated and not in a limiting sense.

I claim:

1. In a sugaring apparatus of the class described, an outer cylindrical casing, end walls connected with said casing and having reduced longitudinally extending journaling extremities, an open ended inner shell of foraminated material arranged to pass axially through said casing and to be connected with the journaling extremities thereof, a conveyer structure situated within said shell for causing materials positioned therein to be advanced longitudinally through the machine and discharged from the opposite end of the shell, said shell and casing being substantially spaced to provide a sugar receiving chamber therebetween, whereby upon the rotation of said casing sugar will be sifted through said shell into engagement with the materials contained in the latter, and means for effecting the rotation of said casing.

2. In an apparatus of the class described, an outer cylindrical casing mounted for axial rotation, an inner shell of foraminated material arranged to extend longitudinally and axially through said casing, the ends of said shell being connected with the journaling ends of said casing, means for introducing material into one end of said shell and to discharge the same from the opposite end thereof, a spiral flight conveyer situated within said shell to force materials longitudinally through the shell, said shell and casing being substantially spaced to provide a sugar receiving chamber, and a plurality of lifting devices provided upon the inner wall of said casing and capable of elevating the sugar within said chamber to permit the sugar to sift through the perforated walls of said shell.

3. In an apparatus of the character described, an outer metallic casing, end walls connected with said casing and having reduced journaling extensions, an inner shell having its longitudinal ends arranged to be connected with the journaling extensions of said casing, the ends of said shell being open to permit of the insertion of material into and to discharge the material from the machine, a spiral conveyer positioned within said conveyer and arranged to effect the positive advancement of material therethrough from the receiving to the discharge ends thereof, the walls of said shell and casing being relatively spaced to provide a sugar receiving chamber therebetween, whereby upon the rotation of said casing sugar will be caused to penetrate said shell to intermingle with the contents thereof, and a plurality of lifting blades provided upon the inner wall of said casing and arranged to lift the sugar within said chamber to permit the latter to penetrate said shell, said blades being longitudinally curved to direct the sugar within said chamber away from the discharge end of the machine.

In testimony whereof I affix my signature.

FRANK H. BAUMGARD.